Oct. 1, 1963 — M. BERESIN — 3,105,300
ARTIFICIAL TEETH
Filed April 11, 1960 — 3 Sheets-Sheet 1

INVENTOR.
MORRIS BERESIN
BY Jacob Trachtman
ATTORNEY.

INVENTOR.
MORRIS BERESIN
BY Jacob Trachtman
ATTORNEY.

Oct. 1, 1963  M. BERESIN  3,105,300
ARTIFICIAL TEETH
Filed April 11, 1960  3 Sheets-Sheet 3

INVENTOR.
MORRIS BERESIN
BY Jacob Trachtman
ATTORNEY.

United States Patent Office 3,105,300
Patented Oct. 1, 1963

3,105,300
ARTIFICIAL TEETH
Morris Beresin, 5664 Lebanon Ave., Philadelphia 31, Pa.
Filed Apr. 11, 1960, Ser. No. 21,544
23 Claims. (Cl. 32—2)

The invention relates to artificial teeth and the method of assembling same, and more particularly to artificial teeth of the cusp type and the method of assembling same for occlusal balance.

Heretofore, artificial cusp teeth have been produced and assembled to form dentures. These teeth and dentures, however, generally provide a crown portion with a large number of inclines, intricate angles and triangles in emulation of the natural anatomical cusp pattern. The complex structures of such teeth when incorporated in dentures increase the difficulty of correlating the teeth for balanced occlusion during the different mandibular movements. Thus, the use of such teeth generally provides unsatisfactory dentures which produce localized contact stresses, cusp interference, and instability of the denture bases.

Therefore, it is an object of the invention to provide new and improved artificial teeth of the cusp type having high masticating efficiency which may readily be used to produce dentures providing balanced articulation.

Another object of the invention is to provide new and improved artificial teeth of the cusp type which, while giving the appearance of anatomical teeth, embody mechanical features assuring the efficiency of mastication and allowing their ready assembly to provide balanced articulation.

Another object of the invention is to provide new and improved artificial teeth of the cusp type having preformed inclined contact surfaces corresponding to a predetermined range of condylar and incisal guidance inclinations.

Another object of the invention is to provide new and improved artificial teeth of the cusp type that are preformed to given specifications for assembly by use of standard articulating devices to provide coordination and balanced articulation between the upper and lower dentures.

Another object of the invention is to provide new and improved artificial teeth of the cusp type requiring a minimum number of inclined surfaces for increasing the efficiency and ease of mastication, affording balanced articulation, and minimizing the difficulty of assembling teeth to form dentures providing balanced articulation and coordination.

Another object of the invention is to provide new and improved dentures comprised of artificial teeth of the cusp type which are highly efficient and afford ease of mastication and balanced occlusion.

Another object of the invention is to provide a method for assembling preformed artificial teeth of the cusp type for readily providing coordination and balanced articulation with a minimum of effort, skill and time.

The above objects as well as many other objects of the invention are achieved by providing artificial teeth of the cusp type having a particular crown structure and method of assembling same. The bicuspid teeth each comprise a crown with an occlusal portion having a mesial inclined plane contact surface and a distal inclined plane contact surface angularly disposed to each other to provide an apex portion. The crown is provided with a first depressed region intermediate the buccal and lingual ends of the mesial contact surface and a second depressed region intermediatae the buccal and lingual ends of the distal contact surface which intercommunicates with the first depressed region to provide the apex portion with a lingual cusp and a buccal cusp. The first and second depressed regions have inwardly inclined wall surfaces intersecting with the mesial and distal contact surfaces to provide a figure 8 form, and the mesial and distal contact surfaces each also include a marginal plane contact strip between the buccal and lingual cusps. The contact strip of the mesial surface is provided with a mesio-lingual spillway, while the contact strip of the distal strip is provided with a disto-lingual spillway communicating respectively with their depressed regions.

The artificial molar teeth each comprise a crown with an occlusal portion having a mesial set of mesial and distal inclined plane surfaces angularly disposed to each other to provide a mesial apex portion, and a distal set of mesial and distal inclined plane contact surfaces angularly disposed to each other to provide a distal apex portion. The crown, likewise, is provided with a first depressed region intermediate the buccal and lingual ends of the mesial contact surface and a second depressed region intermediate the buccal and lingual ends of the distal contact surface of the mesial set of surfaces, while the crown has a third depressed region intermediate the buccal and lingual ends of the mesial contact surface and a fourth depressed region intermediate the buccal and lingual ends of the distal contact surface of the distal set of surfaces. The first depressed region intercommunicates with the second depressed region to provide said mesial apex portion with a mesio-buccal cusp and a mesio-lingual cusp, while the third depressed region intercommunicates with the fourth depressed region to provide the distal apex portion with a disto-buccal cusp and a disto-lingual cusp. The mesial and distal contact surfaces each include a marginal plane contact strip between its buccal and lingual cusps, so that proximate marginal plane contact strips each provide a V-shaped bucco-lingual contact guide groove intermediate the mesial and buccal cusps. The marginal strips of the mesial surfaces are each similarly provided with a mesio-lingual spillway, while the marginal strips for the distal surfaces are each provided with a disto-lingual spillway for communicating with their respective depressed regions.

The lower anterior teeth each comprise a crown with an incisal occlusal portion having a first mesial plane contact surface and a second surface angularly disposed to the first surface to provide a cusp, while the upper anterior teeth each comprise a crown with an incisal occlusal portion having a lingual distal plane contact surface respectively inclined for contacting the first labial mesial plane contact surface of the complementary lower anterior teeth.

The plane contact surfaces of the teeth are respectively inclined to conform with predetermined condylar and incisal guidance inclination settings of an articulating device and the teeth are arranged to provide dentures with occlusal relationships so that their cusp apexes conform with a transversely cylindrical anterior-posterior compensating surface (commonly referred to as a compensating curve), while the V-shaped intermediate guide grooves are respectively directed substantially along the segment of an arc generated by a radius from its corresponding left and right centers located at the left and right condylar posts of the articulating device.

The method of making artificial dentures with a set of preformed artificial teeth with each posterior tooth comprising a crown with an occlusal portion having a first mesial plane contact surface and a second distal plane contact surface corresponding to a predetermined condylar and incisal guidance inclination comprises positioning a set of preformed lower teeth along the ridge crest of a lower mandibular cast with their long axes mesio-distally perpendicular to the ridge and their cusp apexes each conforming along a line with a transverse cylindrical anterior-posterior compensating surface, and conforming the V-shaped guide grooves between the teeth with the segment of an arc generated by a radius centered respectively at predetermined left and right condylar centers for the left and right lower teeth.

The method of the invention also includes the further steps of positioning a set of preformed upper teeth along the ridge crest of an upper maxillary cast with their long axes mesio-distally perpendicular to the ridge, their mesial and distal plane contact surfaces conforming with and contacting complementary plane contact surfaces of the lower teeth, and their cusp apexes conforming with and being received by the guide grooves of the lower teeth in centric occlusal relationship and aligning the contact surfaces of said upper teeth to said lower teeth for guiding the relative movement and maintaining contact between the contact surfaces of said upper and lower teeth during movement between the centric, lateral and protrusive occlusal relationships of said upper and lower dentures to achieve balanced articulation.

The foregoing and other objects of the invention will become more apparent as the following detailed description of the invention is read in conjunction with the drawings in which.

Like reference numerals designate like parts throughout the several views.

In order to achieve the results of the invention, a plurality of upper and lower anterior and posterior artificial teeth having a particular crown structure embodying the invention are provided for arrangement by use of a standard type articulator 10 in accordance with the method of the invention as illustrated in connection with FIGURES 1–7 inclusive.

Figure 1:
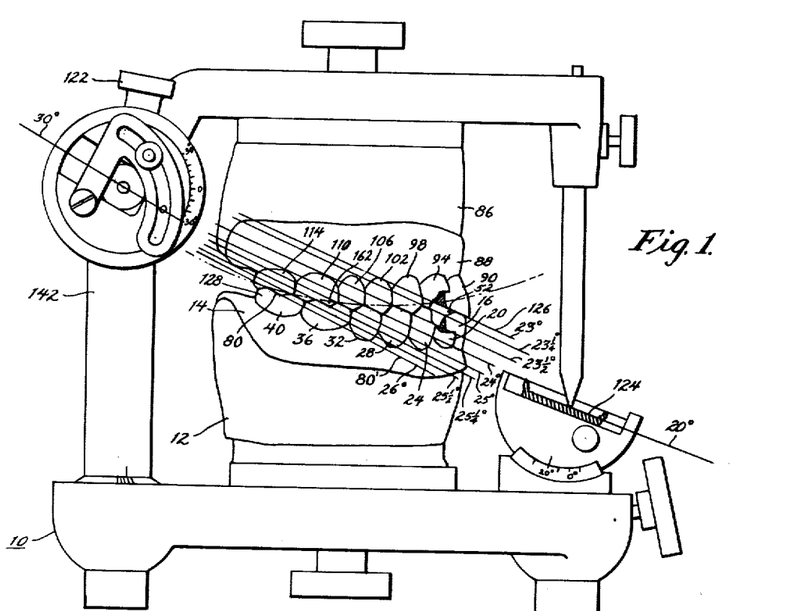
FIGURE 1 is a right side elevational view illustrating the method of arranging the artificial teeth of the invention in centric occlusal relationship for providing upper and lower dentures with balanced articulation.

Refer to FIGURE 1 which is a right side elevational view illustrating the method of arranging the artificial teeth of the invention in centric occlusal relationship for providing upper and lower dentures with balanced articulation.

Figure 7:
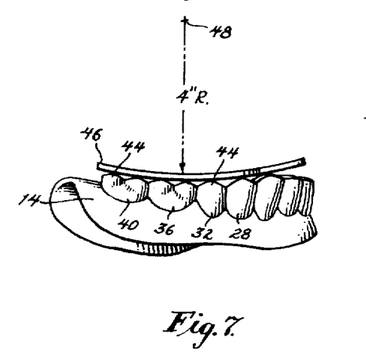
FIGURE 7 is a right side elevational view of the lower denture shown in FIGURE 5 illustrating the conformation of the apexes of the cusps of the artificial teeth with the transversely cylindrical compensating surface.

The articulator 10 supports a lower mandibular cast 12 of an edentulous mouth which has its ridge covered by a base plate 14 of wax denture material in the usual manner of preparing dentures. The lower central incisor teeth 16, 18 and the lower lateral incisor teeth 20, 22 are positioned by the base plate 14 on the crest of the ridge of the mandibular cast 12 (see FIGURE 3). The lower cuspid teeth 24, 26 and the lower posterior teeth comprising the first bicuspids 28, 30, the second bicuspids 32, 34, the first molars 36, 38, and the second molars 40, 42 are also positioned along the crest of the ridge of the mandibular cast 12. The apexes 44 of the cusps of the posterior lower teeth 28, 30, 32, 34, 36, 38, 40 and 42 are conformed to lie on a transversely cylindrical compensating surface provided by the guide 46 shown in FIGURE 7. The compensating surface of the guide is flat transversely and curved in the anterior-posterior direction. The particular guide shown in FIGURE 7 provides a surface which is generated by a radius of 4″ about the axis 48.

Figure 2:
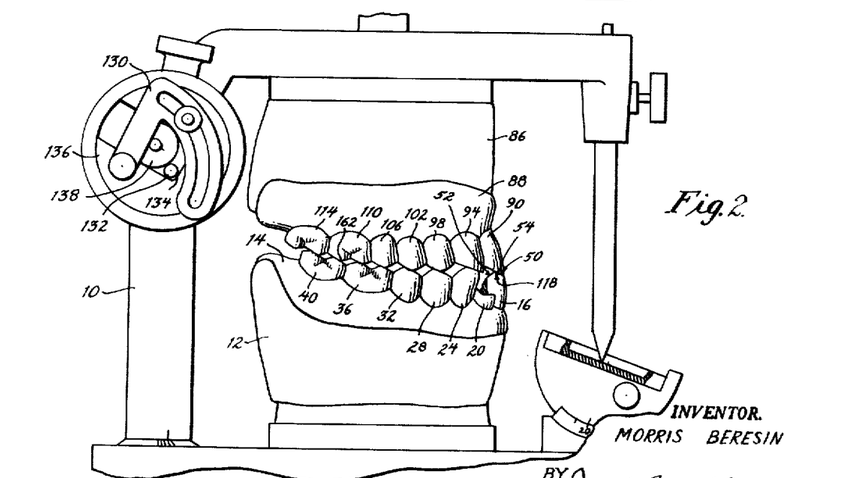
FIGURE 2 is a right side elevational view similar to FIGURE 1 showing the upper and lower dentures in protrusive occlusal relationship.

The lower central incisor teeth 16, 18 are each provided with a mesial inclined plane contact surface 50 and a second distal surface 52 inclined inwardly to form a transverse anterior cusp 54 (see FIGURE 2). The lower lateral incisor teeth 20, 22 each have a labial mesial inclined plane contact surface 56 and a distal inclined plane contact surface 58 forming a transverse cusp 60 (see FIGURES 2, 3 and 9).

The cuspids 24, 26 are provided with an enlarged occlusal surface each having a mesial inclined plane contact surface 62 and a distal inclined plane contact surface 64 angularly disposed to each other to provide a transverse cusp 66.

The first and second bicuspids 28, 30 and 32, 34 each comprise a crown with an occlusal portion having a mesial inclined plane contact surface 68 and a distal inclined plane contact surface 70 angularly disposed to each other to provide an apex portion 72.

A detailed description of the occlusal portion of the crowns of the lower bicuspid teeth will be given in connection wtih the similar upper bicuspid tooth shown in FIGURES 10 and 11.

Each of the first and second molar teeth 36, 38 and 40, 42 has a crown with an occlusal portion having a mesial set of mesial and distal inclined plane contact surfaces 74, 76 angularly disposed to each other to provide a mesial apex portion 78, and a distal set of mesial and distal inclined plane contact surfaces 80, 82 angularly disposed to each other to provide a distal apex portion 84. The detailed structure of the occlusal portion of the crowns of the lower molar teeth will be described in greater detail in connection with the similar upper first molar tooth shown in FIGURES 12 and 13.

The articulator 10 also mounts the maxillary cast 86 which has its ridge covered by a base plate 88 of denture wax material for retaining the upper teeth. The upper teeth retained by the wax denture material include the central incisor teeth 90, 92, lateral incisor teeth 94, 96, and cuspid teeth 98, 100. The upper posterior teeth are also mounted along the ridge of the cast 86 and include the first bicuspids 102, 104, the second bicuspids 106, 108, the first molars 110, 112, and the second molars 114, 116 (see FIGURES 5 and 6).

The occlusal portion of the crowns of the upper teeth are similar to those of the lower teeth except that the upper central incisor teeth 90, 92 are each provided with a lingual distal inclined plane contact surface 118 conforming with and contacting the labial mesial plane contact surfaces 50 of the complementary lower central incisor teeth 16, 18. Similarly, the upper lateral incisor teeth 94, 96 are each provided with a lingual distal inclined plane contact surface 120 conforming with and contacting the labial mesial plane contact surfaces 56 of the complementary lower lateral incisor teeth.

The mesial and distal plane contact surfaces of the upper and lower teeth are preformed for conforming with predetermined condylar and incisal guidance inclinations. Thus, for the illustration in FIGURES 1 and 2, the artificial teeth of the invention are preformed with a condylar guidance inclination of 30° and an incisal guidance of 20°. The locknut 122 of the articulator 10 is set for a condylar guidance inclination of 30°, while the incisal guidance means 124 is set for 20° as shown.

Thus, when the lower preformed artificial teeth, in carrying out the method of the invention, are positioned along the ridge of the mandibular cast 12 with their long axes mesio-distally perpendicular to the ridge and adjacent teeth respectively contacting each other and having their apex portions 44 of the posterior lower teeth conforming with the compensating guide 46 (FIGURE 7) and the upper teeth are positioned along the ridge of the maxillary cast 86, their inclined plane contact surfaces will be in alignment with and contacting the inclined plane contact surfaces of their complementary lower teeth. As seen from FIGURE 1 the distal plane contact surfaces of the upper teeth conform with and contact respective mesial plane contact surfaces of the lower teeth, while respective mesial contact surfaces of the upper teeth conform with and contact related distal plane contact surfaces of the lower teeth.

With the teeth in centric occlusal relationship as shown in FIGURE 1, the mesial plane contact surfaces of the lower teeth intersect with vertical planes parallel to the medial line 152 forming lines with angles or inclinations to the horizontal plane so that the angle of the line 126 of the lower central incisor teeth 16, 18 is approximately 23° for the condylar and incisal settings illustrated, while the line 80 of the distal set of planes 128 has an angle of approximately 26° with the horizontal plane. Thus, the lines thus formed in the mesial contact surfaces of the lower teeth range from 23° to 26° for the settings given as shown in FIGURE 1, and differently inclined planes and resulting inclined lines would be provided to correspond with different condylar and incisal settings of the articulator. For instance, if the condylar and incisal settings were both set to 30° then all of the mesial inclined contact surfaces of the lower teeth would intersect with vertical planes parallel to the median line providing an inclination to the horizontal plane of approximately 30°.

With the teeth thus arranged and coordinated in the centric occlusal relationship shown in FIGURE 1, they may be made to assume their protrusive relationship by moving the articulator to the position shown in FIGURE 2. In going from the centric relationship to the protrusive relationship, the upper and lower teeth maintain sliding contact between their complementary distal and mesial plane contact surfaces, thereby providing balanced articulation. In this connection, it is noted that the stop 130 of the articulator 10 is adjusted to limit the motion of the articulator to a range of approximately 3 millimeters for determining the functional range and the protrusive limiting position of edge to edge contact of the upper and lower central incisor teeth 16, 18 and 90, 92. This is readily achieved by inserting a guide post 132 of proper diameter between the edge 134 of the condylar guide means 136 and the condylar ball element 138 for each of the right and left condylar guide posts 140, 142 (see FIGURES 2 and 3).

Because of the limited functional range of the dentures and the cusp structure of the teeth, it has been found that teeth provided with a condylar guidance inclination of 30° and an incisal guidance inclination of 20° chosen as average values can accommodate respectively condylar inclinations between 10° and 40° and incisal inclinations between 5° and 30° in various combinations while still providing balanced articulation in all functional movements and positions. Due to the particular structure of the teeth embodying the invention, such balanced articulation is achieved without in any way altering the occlusal surface of the teeth such as by grinding or otherwise. This is a great advantage in that within the given ranges different sets of teeth need not be provided for the various possible combinations of condylar and incisal inclinations for different patients.

The left views of the dentures in their centric and protrusive relationship are similar to their right views respectively shown in FIGURES 1 and 2.

Figure 3:
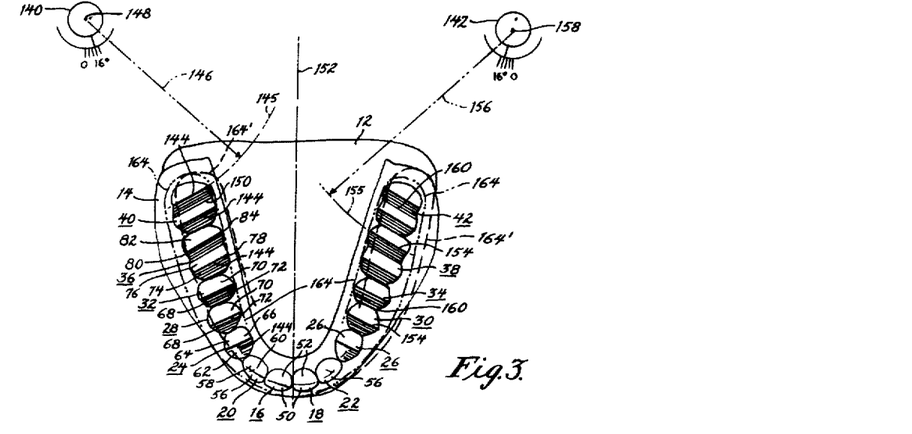
FIGURE 3 is a plan view of a lower denture of FIGURE 1 showing the arrangement of the artificial teeth with their crowns in unfinished form for illustrating the relationship of their mesial and distal inclined plane surfaces.

FIGURE 3 is a plan view of the lower mandibular cast 12 with the lower teeth positioned on the ridge and shown with their crown portions unfinished illustrating the mesial and distal inclined plane contact surfaces.

From FIGURE 3 it is noted that the lower central incisor teeth 16, 18 are provided with labial mesial inclined plane contact surfaces 50 while the lateral incisor teeth 20, 22 and the cuspid teeth 24, 26 each have a set of mesial and distal inclined plane contact surfaces angularly disposed to form a transverse cusp as described in detail above.

Similarly, each of the bicuspid teeth are provided with a set of mesial and distal inclined plane contact surfaces angularly disposed to form a bucco-lingually extending apex portion providing buccal and lingual cusps. Each of the molar teeth 36, 38 and 40, 42 substantially comprises a combination of two bicuspid teeth with a mesial set of mesial and distal inclined plane contact surfaces and a distal set of such surfaces.

The upper teeth, in accordance with the earlier explanation, have plane contact surfaces similar to the lower teeth except for the plane contact surfaces of the incisor teeth 90, 92 and 94, 96 which have distal inclined plane contact surfaces.

Thus, with the upper and lower teeth positioned as shown in FIGURES 1 and 2, the teeth may move between their centric and protrusive occlusal positions within the predetermined functional range while maintaining contact between their complementary contact surfaces providing balanced articulation.

It is particularly noted that the functional range for the dentures and the cusp construction is such that when the dentures are in centric occlusal relationship shown in FIGURE 2, this position provides for substantial contact between the distal inclined plane contact surfaces of the upper teeth and the mesial inclined plane contact surfaces of the lower teeth, rather than providing contact between the upper and lower teeth at their apex lines. Thus the established relationship avoids the unstable equilibrium and possible interlocking action resulting where the teeth are in opposing apex to apex position or are required to move beyond such position to assume their centric occlusal relationship.

FIGURES 3 to 6 inclusive illustrate the movement of the dentures between their centric and working or lateral occlusal positions. Particularly, the figures illustrate the dentures in right lateral occlusion, it being noted that for left lateral occlusion the symmetrically interchanged relationship would be applicable.

In FIGURE 3 it is also noted that the right lower teeth and the apex lines 144 formed by the intersection of each set of mesial and distal inclined plane contact surfaces are directed substantially along the segment of an arc 145 generated by a radius 146 from the center 148 of the right condylar post 140 of the articulator 10. Correspondingly, the groove lines 150 which are formed by the intersection of adjacent distal and mesial inclined plane contact surfaces between adjacent teeth and proximate and distal sets of planes of the molar teeth are similarly directed along the segment of an arc generated by a radius 146 from the center 148. Thus, the apex lines 144 and groove line 150 define the mesio-distal boundaries of each of the plane contact surfaces.

The V-shaped guide grooves thus defined between adjacent V-shaped distal and mesial contact planes are directed along the segment of an arc generated by appropriate respective radii centered at the point 148. The bucco-lingual directions of such grooves, as readily seen from FIGURE 3, are not perpendicular to but are directed at an angle to the median line 152.

Similarly, the apex lines 154 are directed substantially along a segment of an arc 155 generated by respective radii 156 from the center 158 of the left condylar post 142 of the articulator 10. The groove lines 160 which are formed by the intersection of adjacent lateral and mesial inclined plane contact surfaces between adjacent teeth and proximate and distal sets of planes of the molar teeth are likewise directed along the segment of an arc generated by respective radii 156 from the center 158. The apex lines 154 and the groove lines 160 provide the mesio-distal boundaries of the contact surfaces, while V-shaped guide grooves are also formed as explained in connection with the right lower teeth.

Since the upper teeth are set to conform with the lower teeth, the apex portions 162 of the upper posterior teeth interdigitate and are received within the V-shaped grooves of the lower teeth as clearly shown in FIGURE 1 when the teeth are in their centric occlusal relationship. The relative sliding action of the apex portions 162 of the upper posterior teeth in their protrusive position results in the movement of the apex portions 162 out of contact with the groove lines 150, 160 of the lower teeth as shown in FIGURE 2.

Figure 4:
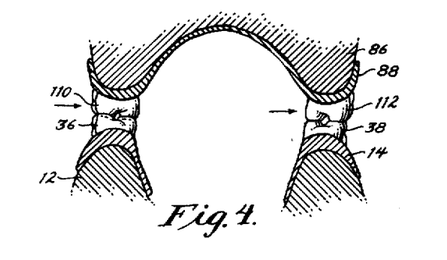
FIGURE 4 is a substantially transverse elevational view of the upper and lower dentures with portions broken away illustrating the right lateral occlusal position.

The dashed lines 164 of FIGURE 3 show the general outline along the vertical walls of the upper teeth superimposed over the lower teeth illustrating the overbite relationship. The dashed lines at 164' show the position of the upper teeth with respect to the lower teeth when in right lateral occlusal relationship. After moving into this relationship, the sets of upper and lower right teeth are in substantial alignment as indicated by FIGURES 3 and 4 while the overbite of the upper left teeth is increased and they move rearwardly with respect to the lower left teeth. This action is illustrated with the articulator adjusted for the Bennett lateral movement of 16° as indicated by the calibration around the right and left condylar posts 140, 142 shown in FIGURE 3.

Figure 5:
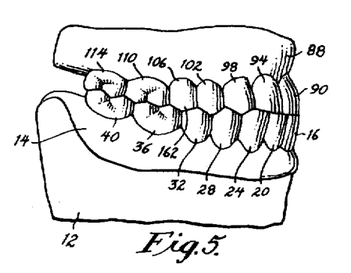
FIGURE 5 is a right side elevational view of the dentures shown in FIGURE 4 illustrating working occlusion.
Figure 6:
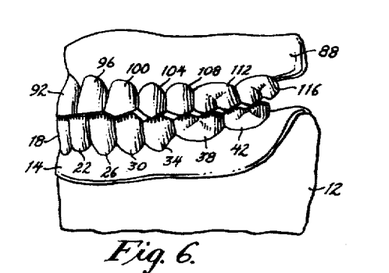
FIGURE 6 is a left side elevational view of the dentures shown in FIGURE 5 illustrating balanced occlusion.

When in right lateral occlusal relationship, the right upper and lower teeth assume the position clearly shown in FIGURE 5 with the apex portions 162 of the upper posterior teeth received within and proximate to the groove lines 150 of the V-shaped guide grooves. The rearward motion of the upper left teeth with respect to the lower left teeth causes them to assume the relative position shown in FIGURE 6. In this action, the distal inclined plane contact surfaces ride up on their complementary mesial inclined plane contact surfaces of the lower left teeth. The appearance of the teeth in FIGURE 6 closely resembles that of the teeth in FIGURE 2 in protrusive relationship, except for the increased overbite produced in the working occlusal relationship illustrated by FIGURE 6. When going from centric occlusal relationship to lateral occlusal relationship, the complementary contact surfaces of the upper and lower teeth execute a sliding action without loosing contact, thereby maintaining balanced occlusion and articulation.

Of course, the similar reversed relationships occur when the dentures are caused to assume their left lateral occlusal relationship. Thus, in moving between any of the possible relationships within the working range of the dentures, contact is maintained between the complementary contact surfaces of the upper and lower teeth, thus assuring balanced articulation in all relative positions.

Thusfar, the arrangement of upper and lower anterior and posterior artifical teeth having a particular crown structure embodying the invention has been disclosed in connection with the articulator 10 which may be of the type such as the well known Hanau articulator. In the process of arranging the teeth to form upper and lower dentures, such as the upper dentures 166 and the lower denture 168 shown respectively in FIGURES 8 and 9, the five basic principles of balanced occlusion are incorporated including coordination between: (1) inclination of condylar guidance; (2) prominence of the compensating surface; (3) inclination of the plane of orientation; (4) inclination of the incisal guidance; and (5) height of the cusps.

The set of artificial teeth are formed, as previously described, for a particular condylar guidance inclination and incisal guidance inclination. The values of 30° for the condylar guidance inclination and 20° for the incisal guidance inclination and 3 millimeters functional range were chosen for this example as good average values, although the teeth may be set for coordination with other desired inclinations, as for example, within the ranges already given above. The lower posterior teeth are conformed with a transverse cylindrical anterior-posterior compensating surface which may be provided by a guide 46 with a 4" generating radius, while the inclination of the plane of orientation is determined by measurements taken in the patient's mouth. The height of the cusps of the teeth are determined by the particular settings of the articulator for providing coordination in the relative movement of the upper and lower teeth as shown in the figures and described above.

With the teeth preformed in this manner, the method of assembling the teeth for making artificial dentures comprises positioning a set of preformed lower teeth along the ridge crest of a lower mandibular cast with their long axes mesio-distally perpendicular to the ridge and their cusp apexes each conforming along a line with a transverse cylindrical anterior-posterior compensating surface, and conforming the V-shaped guide grooves between the teeth with the segment of an arc generated by a radius centered respectively as predetermined left and right condylar centers for the left and right lower teeth.

The teeth of the upper denture are positioned along the ridge crest of an upper maxillary cast with their long axes mesio-distally perpendicular to the ridge, the mesial and distal plane contact surfaces conforming with and contacting complementary plane contact surfaces of the lower teeth and their cusp apexes conforming with and being received by the guide grooves of the lower teeth in centric occlusal relationship and aligning the contact surfaces of said upper teeth to said lower teeth for guiding the relative movement and maintaining contact between the contact surfaces of said upper and lower teeth during movement between the centric, lateral and protrusive occlusal relationships of said upper and lower dentures to achieve balanced articulation.

With the preformed teeth and the articulator set to conform with the particular incisal and condylar inclinations for the preformed artificial teeth and the patient's measurements, the utilization of the method of the invention for positioning such teeth readily provides balanced articulation between the teeth and harmony in their movement with a minimum effort to achieve coordination and balanced articulation. Such arrangement of the teeth and preparation of dentures are also achieved in compliance with the five basic principles of balanced articulation listed above.

Figure 8:
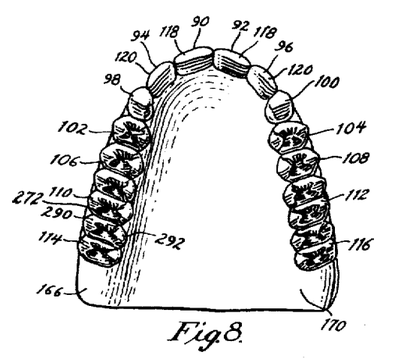
FIGURE 8 is a plan view of an upper denture including the teeth of the invention made in accordance with the method of the invention.
Figure 9:
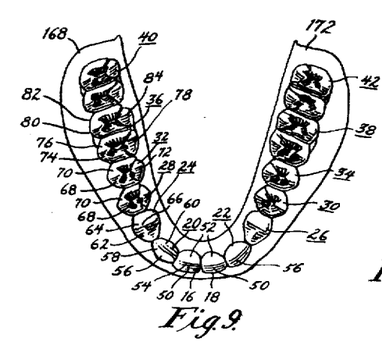
FIGURE 9 is a plan view of a lower denture including the teeth of the invention made in accordance with the method of the invention.

After the teeth are properly set in accordance with the method along the ridge of the casts 12, 86, they are embedded in the appropriate acrylic supporting base 170 for the upper denture 166 and supporting base 172 for the lower denture 168, as shown in FIGURES 8 and 9, utilizing the methods well known in the art. The crown portions of the upper and lower anterior and posterior teeth of FIGURES 8 and 9 show the details which were omitted for purposes of clarity from the lower teeth shown in FIGURE 3. The details of this structure will be described more completely in connection with the enlarged views of the upper right second bicuspid teeth 106 and the upper right first molar tooth 110.

Figure 10:
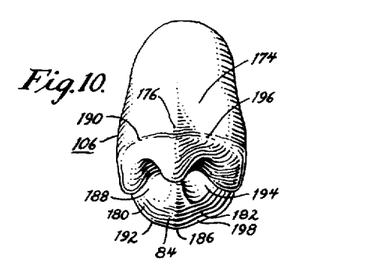
FIGURE 10 is an enlarged perspective view of an artificial upper bicuspid tooth embodying the invention.
Figure 11:
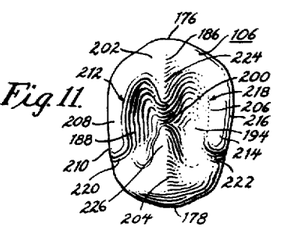
FIGURE 11 is a plan view of the tooth of FIGURE 10.

FIGURES 10 and 11 are enlarged views of the upper right second bicuspid tooth 106 particularly showing the details of its crown structure.

The buccal vertical wall 174 of the tooth 106 is formed to provide a protruding central peaked region 176 lending a natural appearance to the tooth, while the lingual vertical wall 178 has a smooth arcuate form. The crown of the tooth 106 has an occlusal portion with a mesial plane contact surface 180 and a distal plane contact surface 182 angularly disposed to each other to provide an apex portion 184 terminating in an apex line or summit 186. The mesial contact surface 180 has a depressed region 188 intermediate the buccal end 190 and lingual end 192. Similarly, a second depressed region 194 is located intermediate the buccal end 196 and lingual end 198 of the distal contact surface 182. The mesial and distal depressed regions 188, 194 intercommunicate with each other by a central connecting channel 200 providing the apex portion 184 with a buccal cusp 202 and a lingual cusp 204.

The mesial and distal depressed regions 188, 194 have inwardly inclined wall surfaces intersecting along a line 206 with the mesial and distal contact surfaces 180, 182 to provide a figure 8 form or outline as clearly seen in FIGURE 11. The walls of each of the depressed regions 188, 194 simulate an inverted conical section.

The mesial contact surface 180 includes a marginal plane contact strip 208 between the buccal cusp 202 and the lingual cusp 204 defined by the mesial wall 210 and the edge 212 of the mesial depressed region 188.

Similarly, the distal contact surface 182 includes a marginal plane contact strip 214 between the buccal cusp 202 and the lingual cusp 204 defined by the distal wall 216 and the edge 218 of the distal depressed region 194.

The marginal contact strip 208 is provided with a mesio-lingual spillway 220 connecting with the mesial depression 188 and extending between the edge 212 of the depressed region 188 and the mesial outer wall 210 of the tooth 106. The marginal plane contact strip 214 is likewise provided with a disto-lingual spillway connecting with the distal depressed region 194 and extending between the edge 218 of the depressed region 194 and the distal outer wall 216.

The crown of the tooth 106 is thus provided with the mesial and distal plane contact surfaces 180, 182 having respective depressed regions 188, 194 which are interconnected by a channel 200 forming and separating the crown into buccal and lingual cusps 202, 204. The buccal and lingual cusps are thus formed from the apex portion 184 by the inclined contact surfaces 180, 182 and include the inwardly directed smoothly peaked projections 224, 226. The apex portion with its inclined surfaces and the projections 224, 226 form highly efficient masticating cusps which interdigitate with complementary teeth and are capable of asserting high pressures on limited regions, thereby increasing their masticating efficiency. The form of the depressed regions increases the efficiency of function of the teeth in enlarging the pressure which can be exerted by the cusps and provide a reservoir for food which accumulates during the masticating process. The lingual spillways 220, 222 assist in discharging food particles collected in the depressions into the lingual region of the mouth. The smoothness of the contour and the walls of the depressed region prevent the retention of food thereby increasing the ease of mechanical cleansing and improves self-cleaning action during mastication.

Although the bicuspid tooth 106 embodies all the mechanical features of the invention including the angularly disposed plane contact surfaces and depressed regions, the resulting configuration provides the tooth with an appearance simulating the esthetic effect of the natural teeth.

Figure 12:
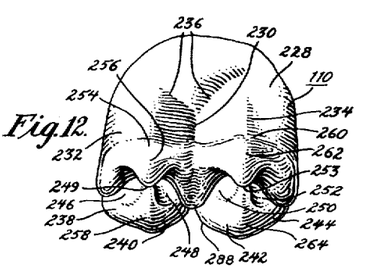
FIGURE 12 is an enlarged perspective view of an artificial molar tooth embodying the invention.
Figure 13:
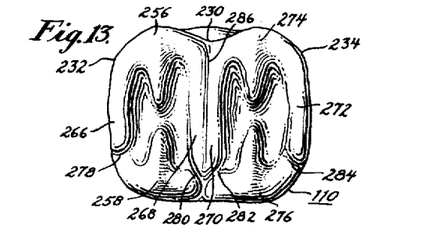
FIGURE 13 is a plan view of the artificial tooth shown in FIGURE 12.

The first upper molar tooth 110 shown in enlarged form in FIGURES 12 and 13 is in many respects similar to the bicuspid tooth 106 described above in connection with FIGURES 10 and 11, wherein essentially two of the bicuspid teeth 106 are combined to form the molar tooth 110. Thus, many of the features described in connection with the bicuspid tooth 106 and which are embodied in the molar tooth 110 will not be described in detail.

The molar tooth 110 is provided with an outer vertical buccal wall 228 which is divided by the vertical groove 230 into a mesial portion 232 and a distal portion 234. The V-shaped grooves 236 and the vertical groove 230 provide the vertical wall 228 with a natural appearance.

The mesial portion 232 of tooth 110 includes a crown having a mesial set of mesial and distal inclined plane contact surfaces 238, 240 while the distal portion 234 has a crown with a distal set of mesial and distal inclined plane contact surfaces 242, 244. The mesial portion 232 of the crown is provided with first and second depressed regions 246, 248, while the distal portion of the crown is provided with depressed regions 250, 252 as described in detail in connection with the tooth 106. The first and second depressions 246, 248 are interconnected by a channel 249 to provide the mesial apex portion 254 of the mesial portion 232 of the tooth 110 with a mesio-buccal cusp 256 and a mesio-lingual cusp 258. The third and fourth depressed regions 250, 252, similarly, are interconnected by a channel 253 to provide the distal apex portion 260 of the distal portion 234 of the tooth 110 with a disto-buccal cusp 262 and a disto-lingual cusp 264. The depressed regions of the crown of tooth 110 similarly form mesial and distal marginal plane contact strips 266, 268 between the mesio-buccal cusp 256 and the mesio-lingual cusp 258 of the mesial portion 232, while the mesial and distal marginal plane contact strips 270, 272 are provided between the disto-buccal cusp 274 and disto-lingual cusp 276 of the distal portion 234 of the molar tooth 110. Lingual spillways 278, 280 are provided for the mesial portion 232, while mesial spillways 282, 284 are provided for the distal portion 234 of the crown of the tooth 110.

The adjacent distal marginal plane contact strip 268 and the mesial marginal plane contact strip 270 respectively of the tooth 110 and mesial and distal portions 232, 234 intersect in a groove line 286 and define a V-shaped guide groove 288 between the mesial and distal portions 232, 234 of the crown of tooth 110. Of course, similar guide grooves are formed between distal and mesial marginal plane contact strips of adjacent teeth, such as between the distal strip 272 of the first molar tooth 110 and the mesial contact strip 290 of the adjacent mesial portion 292 of the upper second molar tooth 114 (see FIGURE 8).

Thus, the molar teeth, as well as all of the other teeth, similarly incorporate all of the mechanical features of the invention providing efficiency of mastication, a structure for affording balanced occlusion of the teeth in the denture, and an appearance which simulates naturalness providing the desired esthetic effect.

In this manner, all of the teeth described embody the invention providing a predetermined structure which allows them to be used in making dentures according to the method of the invention for efficient mastication which is essential for the usefulness of the dentures, while avoiding the disadvantages inherent in cusp teeth due to lack of harmony and interference between cusps. The structure of the teeth allows them to be readily formed into dentures for providing harmony between all of the basic factors required for balanced articulation. This results in balanced articulation which is readily achieved by use of the standard articulating devices in connection with the disclosed guide 46 for providing the anterior-posterior compensating curve. The balanced occlusion is achieved within the desired functional range within which the cusp interdigitation also provides mandibular guidance and functional efficiency.

It is also noted that the teeth may be preformed to coordinate with any desired settings of the articulator or registration obtained in the mouth even though such settings or registrations may differ from the average settings used and particularly described in connection with the illustration of the invention.

It will, of course, be understood that the description and drawings, herein contained, are illustrative merely, and that various modifications and changes may be made in the structure disclosed without departing from the spirit of the invention.

What is claimed is:

1. An artificial posterior tooth comprising a crown with an occlusal portion having a mesial inclined plane contact surface and a distal inclined plane contact surface angularly disposed to each other to provide an apex portion, said apex portion having an intermediate enclosed depressed region conforming to an inverted substantially conical section providing said apex portion with a lingual cusp and a buccal cusp.

2. An artificial posterior tooth comprising a crown with an occlusal portion having a mesial set of mesial and distal inclined plane contact surfaces angularly disposed to each other to provide a mesial apex portion, and a distal set of mesial and distal inclined plane contact surfaces angularly disposed to each other to provide a distal apex portion, said mesial apex portion having an intermediate enclosed depressed region conforming to an inverted substantially conical section providing said mesial apex portion with a mesio-lingual cusp and a mesio-buccal cusp, said distal apex portion having an intermediate enclosed depressed region conforming to an inverted substantially conical section providing said distal apex portion with a disto-lingual cusp and a disto-buccal cusp.

3. The tooth of claim 2 in which the distal contact surface of said mesial set of surfaces and the mesial contact surface of said distal set of surfaces provide a V-shaped bucco-lingual contact guide groove intermediate said mesial and buccal cusps.

4. An artificial posterior tooth comprising a crown with an occlusal portion having a mesial inclined plane contact surface and a distal inclined plane contact surface angularly disposed to each other to provide an apex portion, said crown having a first enclosed depressed region conforming to an inverted substantially conical section intermediate the buccal and lingual ends of said mesial contact surface and a second enclosed depressed region conforming to an inverted substantially conical section intermediate the buccal and lingual ends of said distal contact surface which intercommunicates with said first depressed region to provide said apex portion with a lingual cusp and a buccal cusp.

5. An artificial posterior tooth comprising a crown with an occlusal portion having a mesial inclined plane contact surface and a distal inclined plane contact surface angularly disposed to each other to provide an apex portion, said crown having a first depressed region intermediate the buccal and lingual ends of said mesial contact surface and a second depressed region intermediate the buccal and lingual ends of said distal contact surface which intercommunicates wtih said first depressed region to provide said apex portion with a lingual cusp and a buccal cusp, said first and second depressed regions having inwardly inclined wall surfaces intersecting with said mesial and distal contact surfaces to provide a figure 8 form.

6. The tooth of claim 5 in which said mesial and distal contact surfaces each include a marginal plane contact strip between said buccal cusp and said lingual cusp.

7. The tooth of claim 5 in which the contact strip of said mesial surface is provided with a mesio-lingual spillway and the contact strip of said distal surface is provided with a disto-lingual spillway.

8. An artificial posterior tooth comprising a crown with an occlusal portion having a mesial set of mesial and distal inclined plane contact surfaces angularly disposed to each other to provide a mesial apex portion, and a distal set of mesial and distal inclined plane contact surfaces angularly disposed to each other to provide a distal apex portion, said crown having a first enclosed depressed region conforming to an inverted substantially conical section intermediate the buccal and lingual ends of the mesial contact surface and a second enclosed depressed region conforming to an inverted substantially conical section intermediate the buccal and lingual ends of the distal contact surface of said mesial set of surfaces, said crown having a third enclosed depressed region conforming to an inverted substantially conical section intermediate the buccal and lingual ends of the mesial contact surface and a fourth enclosed depressed region conforming to an inverted substantially conical section intermediate the buccal and lingual ends of the distal contact surface of said distal set of surfaces, said first depressed region intercommunicating with said second depressed region to provide said mesial apex portion with a mesio-buccal cusp and a mesio-lingual cusp, said third depressed region intercommunicating with said fourth depressed region to provide said distal apex portion with a disto-buccal cusp and a disto-lingual cusp.

9. An artificial posterior tooth comprising a crown with an occlusal portion having a mesial set of mesial and distal inclined plane contact surfaces angularly disposed to each other to provide a mesial apex portion, and a distal set of mesial and distal inclined plane contact surfaces angularly disposed to each other to provide a distal apex portion, said crown having a first depressed region intermediate the buccal and lingual ends of the mesial contact surface and a second depressed region intermediate the buccal and lingual ends of the distal contact surface of said mesial set of surfaces, said crown having a third depressed region intermediate the buccal and lingual ends of the mesial contact surface and a fourth depressed region intermediate the buccal and lingual ends of the distal contact surface of said distal set of surfaces, said first depressed region intercommunicating with said second depressed region to provide said mesial apex portion with a mesio-buccal cusp and a mesio-lingual cusp, said third depressed region intercommunicating with said fourth depressed region to provide said distal apex portion with a disto-buccal cusp and a disto-lingual cusp, said first and second depressed regions having inwardly inclined wall surfaces to respectively provide substantially conical depressions intersecting with the mesial and distal contact surface of said mesial set of surfaces to provide a figure 8 form.

10. The tooth of claim 9 in which said third and fourth depressed regions have inwardly inclined surfaces to respectively provide substantially conical depressions intersecting with the mesial and distal contact surfaces of said mesial set of surfaces to provide a figure 8 form, and said mesial and distal contact surfaces each include a marginal plane contact strip between its said buccal and lingual cusps.

11. The tooth of claim 10 in which the marginal strip of the distal contact surface of said mesial set of surfaces and the marginal strip of the mesial contact surface of said distal set of surfaces provide a V-shaped bucco-lingual contact guide groove intermediate said mesial and buccal cusps.

12. The tooth of claim 11 in which the marginal strips of said mesial surfaces are each provided with a mesio-lingual spillway and the marginal strips of said distal surfaces are each provided with a disto-lingual spillway.

13. An artificial denture including a plurality of posterior teeth each comprising a crown with an occlusal portion having a mesial inclined plane contact surface and a distal inclined plane contact surface angularly disposed to each other to provide an apex portion, said apex portion having an intermediate enclosed depressed region conforming to an inverted substantially conical section providing said apex portion with a lingual cusp and a buccal cusp.

14. An artificial denture including a plurality of bicuspid teeth each comprising a crown with an occlusal portion having a mesial inclined plane contact surface and a distal inclined plane contact surface angularly disposed to each other to provide an apex portion; the crown of each of said bicuspid teeth having a first depressed region intermediate the buccal and lingual ends of said mesial contact surface and a second depressed region intermediate the buccal and lingual ends of said distal contact surface which intercommunicates with said first depressed region to provide said apex portion with a lingual cusp and a buccal cusp; and a plurality of molar teeth each comprising a crown with an occlusal portion having a mesial set of mesial and distal inclined plane contact surfaces angularly disposed to each other to provide a mesial apex portion, and a distal set of mesial and distal inclined plane contact surfaces angularly disposed to each other to provide a distal apex portion; the crown of each of said molar teeth having a first depressed region intermediate the buccal and lingual ends of the mesial contact surface and a second depressed region intermediate the buccal and lingual ends of the distal contact surface of said mesial set of surfaces, the crown of each of said molar teeth having a third depressed region intermediate the buccal and lingual ends of the mesial contact surface and a fourth depressed region intermediate the buccal and lingual ends of the distal contact surface of said distal set of surfaces, said first depressed region intercommunicating with said second depressed region of each of said molar teeth to provide said mesial apex portion with a mesio-buccal cusp and a mesio-lingual cusp, said third depressed region intercommunicating with said fourth depressed region of each of said molar teeth to provide said distal apex portion with a disto-buccal cusp and a disto-lingual cusp.

15. The denture of claim 14 providing a lower denture including a plurality of lower anterior teeth each comprising a crown with an occlusal portion having a first mesial plane contact surface and a second surface angularly disposed to said first surface to provide a cusp; and an upper denture including a plurality of upper anterior teeth each comprising a crown with an occlusal portion having a distal plane contact surface respectively inclined for contacting the first mesial plane contact surfaces of the complementary anterior teeth of said lower denture.

16. The denture of claim 14 in which said first and second depressed regions of said bicuspid and molar teeth have inwardly inclined surfaces intersecting with said mesial and distal contact surfaces to provide a figure 8 form, said mesial and distal contact surfaces each include a marginal plane contact strip between said buccal and lingual cusps, and each of the contact strips of said mesial surfaces is provided with a mesio-lingual spillway and each of the contact strips of said distal surfaces is provided with a disto-lingual spillway.

17. The denture of claim 16 providing a lower denture including a plurality of lower anterior teeth each comprising a crown with an occlusal portion having a first mesial plane contact surface and a second surface angularly disposed to said first surface to provide a cusp, and an upper denture including a plurality of upper anterior teeth each comprising a crown with an occlusal portion having a distal plane contact surface respectively inclined for contacting the first mesial plane contact surfaces of the complementary anterior teeth of said lower denture.

18. A lower artificial denture including a plurality of posterior teeth each comprising a crown with an occlusal portion having a first mesial plane contact surface and a second distal plane contact surface disposed to each other to provide a cusp with an apex line, the infinitesimal displacement of said denture with any two of the apex lines of said teeth displaced along the planes of their respective mesial contact surfaces defining the respective planes of the remaining mesial contact surfaces of said teeth as the surfaces generated by their respective apex lines, and said teeth being arranged with their cusp apex lines conforming with a transversely cylindrical anterior-posterior compensating surface.

19. The denture of claim 18 in which each pair of proximate mesial and distal contact surfaces respectively of the left and right teeth provides a V-shaped intermediate guide groove directed substantially along the segment of an arc generated by a radius from corresponding left and right centers located behind the left and right posterior teeth.

20. The denture of claim 18 in which said mesial contact surfaces conform with respective inclined planes having inclinations to the horizontal of between 20° to 30° within a functional range of 2 millimeters to 5 millimeters along said inclined planes, and said cylindrical compensating curve has a four-inch generating radius.

21. An upper artificial denture including a plurality of posterior teeth each comprising a crown with an occlusal portion having a first mesial plane contact surface and a second distal plane contact surface disposed to each other to provide a cusp with an apex line, the infinitesimal displacement of said denture with any two of the apex lines of said teeth displaced along the planes of their respective distal contact surfaces defining the respective planes of the remaining distal contact surfaces of said teeth as the surfaces generated by their respective apex lines and said teeth being arranged with their cusp apex lines conforming with a transversely cylindrical anterior-posterior compensating surface.

22. The denture of claim 21 in which each pair of proximate mesial and distal contact surfaces respectively of the left and right teeth provides a V-shaped intermediate guide groove directed substantially along the segment of an arc generated by a radius from corresponding left and right centers located behind the left and right posterior teeth.

23. The denture of claim 22 in which said distal contact surfaces conform with respective inclined planes having inclinations to the horizontal of between 20° to 30° within a functional range of 2 millimeters to 5 millimeters along said inclined planes, and said cylindrical compensating curve has a four-inch generating radius.

References Cited in the file of this patent

UNITED STATES PATENTS

| | | |
|---|---|---|
| 1,822,837 | Avery | Sept. 8, 1931 |
| 2,620,562 | Folsom | Dec. 9, 1952 |
| 2,716,815 | Ford | Sept. 6, 1955 |
| 2,741,845 | Appenrodt et al. | Apr. 17, 1956 |
| 2,754,589 | Highkin | July 17, 1956 |

UNITED STATES PATENT OFFICE
CERTIFICATE OF CORRECTION

Patent No. 3,105,300                                    October 1, 1963

Morris Beresin

It is hereby certified that error appears in the above numbered patent requiring correction and that the said Letters Patent should read as corrected below.

Column 14, line 23, for the claim reference numeral "18" read -- 19 --.

Signed and sealed this 7th day of April 1964.

(SEAL)
Attest:

ERNEST W. SWIDER
Attesting Officer

EDWARD J. BRENNER

Commissioner of Patents